Sept. 13, 1938.  J. W. SHKOLNICK  2,130,039
SEALING DEVICE FOR PIPE JOINTS
Filed April 12, 1938
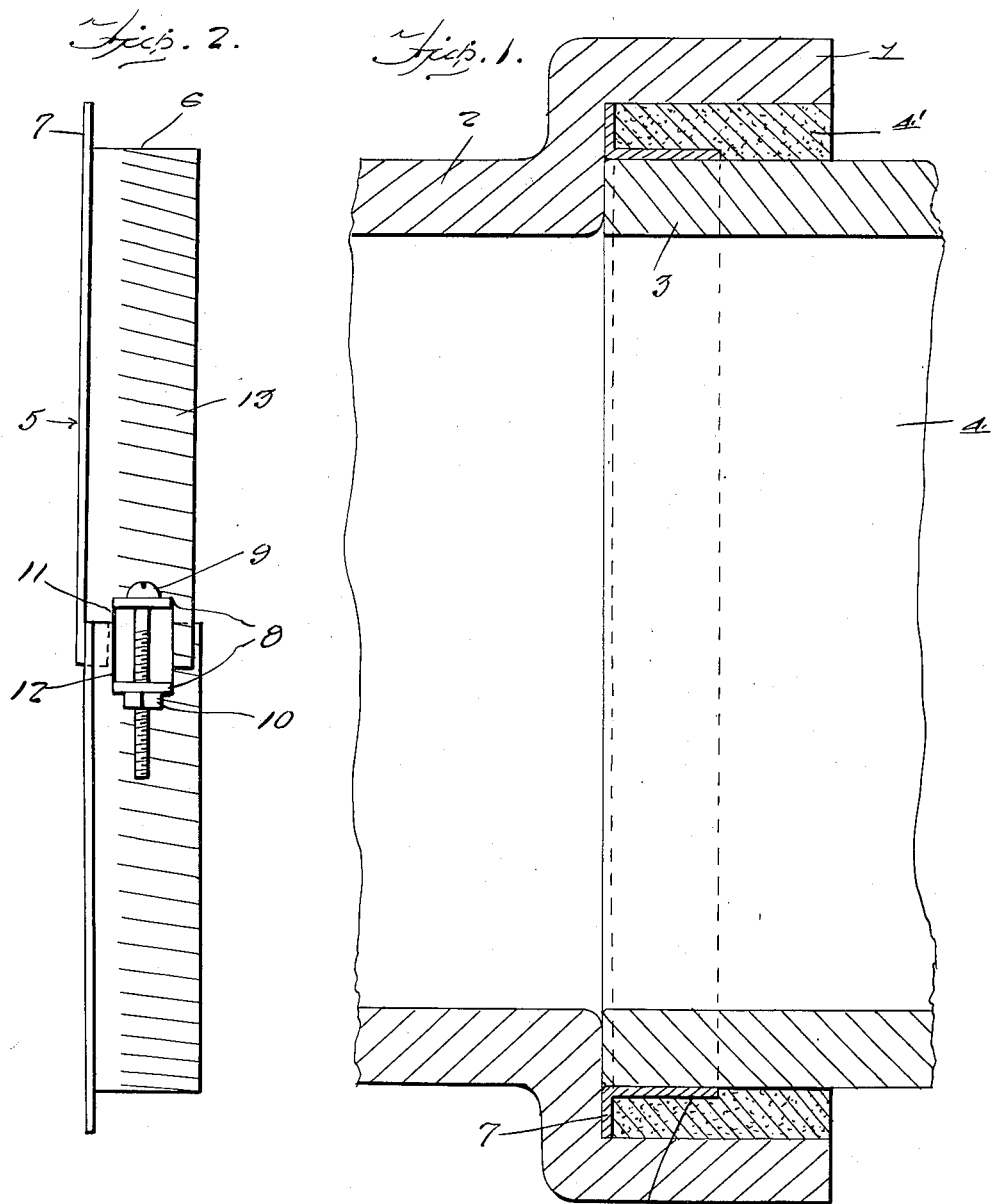
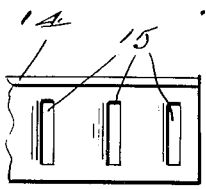
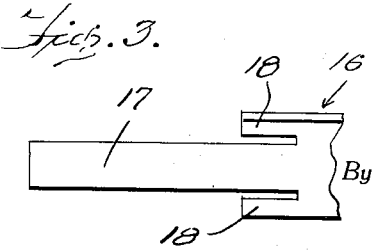
Inventor
J. W. Shkolnick
By Clarence A. O'Brien
and Hyman Berman
Attorneys Patented Sept. 13, 1938

2,130,039

UNITED STATES PATENT OFFICE 2,130,039

SEALING DEVICE FOR PIPE JOINTS

Joseph W. Shkolnick, Centerville, Iowa

Application April 12, 1938, Serial No. 201,619

2 Claims. (Cl. 285—115)

My invention relates to improvements in sealing devices for the joints of bell mouthed sewer tiles, concrete and other sewer pipes where joints are not sealed with hot lead.

As is well known, roots of trees and bushes frequently grow into the joints of bell mouthed sewer pipes breaking down the pipes and entering the same, thereby clogging the line. This necessitates excavation work, taking up and renewing pipes and cleaning out such roots all of which is expensive and results in temporarily blocking the line.

Having the foregoing in mind, it is the principal object of my invention to provide an inexpensive, efficient device which may be readily incorporated in the joints of bell mouthed sewer pipes to prevent roots from breaking into the pipes and partially or completely clogging the same.

To the accomplishment of the above, and subordinate objects presently appearing, a preferred embodiment of my invention, and one modification thereof, have been illustrated in the accompanying drawing, set forth in detail in the succeeding description, and defined in the claims appended hereto.

In said drawing:—

Figure 1 is a fragmentary view in longitudinal section illustrating the application of my invention, Figure 2 is a view in side elevation of the device detached, and Figure 3 is a fragmentary view of a modification of the invention.

Referring to the drawing by numerals, my invention has been shown therein as embodied in the joint of the usual bell mouthed pipe, 1 designating the bell mouth of one section 2, 3 the mating end of the complemental section 4, and 4' the usual calking, of cement or other material, sealing the joint.

The device of my invention comprises a transversely split ring 5 of right angle form in cross section providing a band portion 6 adapted to be sleeved over the end 3 of the section 4, and a right angled flange 7 adapted to fit flush against the rear wall of the bell mouth 1 and in the latter. The free ends of the band portion 6 are provided with a pair of opposed outstanding lugs 8 suitably apertured to receive a screw bolt 9 having a nut 10 threaded thereon and whereby said ring is clamped around said end 3 of the section 4. Preferably the free ends of the band portion 6 are bifurcated, as at 11 and 12, respectively, the furcations overlapping in oppositely arranged relation, as shown in Figure 2, to frictionally interlock and obviate the formation of a gap between said ends. The band portion 6 is also preferably corrugated, as indicated at 13, to prevent the same from being broken under expansion and contraction and to grip the end 3 of the section 4 more tightly than if it were smooth.

The described device is made of copper which corrodes under the effects of dampness. This corrosion forms a light film of basic copper salts on the entire device which are extremely poisonous to plant life. Thus there is formed a field of corrosion directly in the path of roots tending to grow into and through the joint and which said roots cannot penetrate.

In the modified form of the invention shown in Figure 3, one free end 14 of the ring is provided with spaced apart slots 15 and the other free end 16 with a tongue 17 adapted to be inserted in a selected one of said slots and bent around the end 14 to secure the ends of the ring together. The end 16 is also provided with tongues 18 on opposite sides of the tongue 17 adapted to underlie the ends 14 to prevent the formation of a gap between said ends when the latter are secured together.

In applying the described device the same is preferably applied to the end 3 of the section 4 before said end 3 is inserted in the bell mouth 1. By this procedure the flange 7 of the device functions to center the end 3 in the bell mouth 1 during insertion of said end into the latter. Also when setting the pipe the device prevents any loose cement that is being used for sealing the pipe from spilling into the pipe line the advantage of which will be clear.

The foregoing will, it is believed, suffice to impart a clear understanding of my invention without further explanation.

Manifestly the invention is susceptible of modification, other than as described, without departing from the inventive concept and right is herein reserved to such modifications as fall within the scope of the subjoined claims.

What I claim is:—

1. The combination with a bell mouthed pipe section, and a mating pipe section having an end disposed in said bell mouth in spaced relation thereto, of a sealing device comprising a ring of copper fitting around said end of the mating section and having an edge flange fitting into said bell mouth flat against the rear wall thereof.

2. The combination with a bell mouthed pipe section, and a mating pipe section having an end disposed in said bell mouth in spaced relation thereto, of a sealing device comprising a ring of copper fitting around said end of the mating section and having an edge flange fitting into said bell mouth flat against the rear wall thereof, said ring being transversely split, and means detachably securing the free ends of said ring together.

JOSEPH W. SHKOLNICK.